United States Patent
Huang et al.

(10) Patent No.: US 10,709,991 B2
(45) Date of Patent: *Jul. 14, 2020

(54) SYSTEM AND METHOD FOR COOPERATIVE APPLICATION CONTROL

(71) Applicant: Nvidia Corporation, Santa Clara, CA (US)

(72) Inventors: Jen-Hsun Huang, Santa Clara, CA (US); Spencer Huang, Santa Clara, CA (US); Madison Huang, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 15/043,684

(22) Filed: Feb. 15, 2016

(65) Prior Publication Data

US 2016/0294899 A1    Oct. 6, 2016

Related U.S. Application Data

(60) Provisional application No. 62/142,177, filed on Apr. 2, 2015.

(51) Int. Cl.
*A63F 13/847* (2014.01)
*A63F 13/86* (2014.01)
(Continued)

(52) U.S. Cl.
CPC .......... *A63F 13/847* (2014.09); *A63F 13/355* (2014.09); *A63F 13/40* (2014.09);
(Continued)

(58) Field of Classification Search
CPC ... H04L 65/4076; H04L 65/605; H04L 67/10; A63F 13/847; A63F 13/355; A63F 13/86; A63F 13/40; A63F 13/798
See application file for complete search history.

(56) References Cited

U.S. PATENT DOCUMENTS 5,393,070 A    2/1995 Best
6,921,336 B1   7/2005 Best
(Continued)

OTHER PUBLICATIONS

Fu, Hsin-Chia, et al., "Interactive Video Platform for E-Learning and Remote Services," International Journal of Computer Science Issues, vol. 10, Issue 1, No. 1, Jan. 2013, 8 pages.

*Primary Examiner* — Jimmy H Tran (57) ABSTRACT

A system for cooperative application control. In one embodiment, the system includes: (1) a cloud application engine for executing application code configured to allow interaction with an application, generate a video stream corresponding to a particular user and accept a response stream from the particular user to allow the particular user to interact with the application and (2) a cooperative interaction engine associated with the cloud application engine for communication therewith and configured to multicast the video stream from the cloud application engine to the particular user and at least one other user, combine separate response streams from the particular user and the at least one other user into a joint response stream and provide the joint response stream to the cloud application engine.

22 Claims, 3 Drawing Sheets

(51) Int. Cl.
  *A63F 13/40* (2014.01)
  *A63F 13/798* (2014.01)
  *A63F 13/355* (2014.01)
  *H04L 29/06* (2006.01)
  *H04L 29/08* (2006.01)

(52) U.S. Cl.
  CPC ............ *A63F 13/798* (2014.09); *A63F 13/86* (2014.09); *H04L 65/4076* (2013.01); *H04L 65/605* (2013.01); *H04L 67/10* (2013.01)

(56) References Cited

U.S. PATENT DOCUMENTS

| | | | |
|---|---|---|---|
| 6,966,837 B1 | 11/2005 | Best | |
| 7,497,776 B1 | 3/2009 | Roman | |
| 8,012,025 B2* | 9/2011 | Hillis | A63F 13/02 463/43 |
| 8,490,012 B2* | 7/2013 | Marinkovich | G06F 3/0481 715/751 |
| 8,834,277 B2* | 9/2014 | Perry | A63F 13/10 463/42 |
| 9,158,746 B2* | 10/2015 | Bartek | G06F 17/24 |
| 9,280,529 B2* | 3/2016 | Lemonik | G06F 17/2288 |
| 9,398,086 B2* | 7/2016 | Su | H04W 4/21 |
| 9,421,455 B1 | 8/2016 | Connor et al. | |
| 9,616,341 B2 | 4/2017 | Connor et al. | |
| 9,987,561 B2 | 6/2018 | Huang et al. | |
| 2002/0169617 A1 | 11/2002 | Luisi | |
| 2003/0199319 A1 | 10/2003 | Culbert | |
| 2005/0227766 A1 | 10/2005 | Kaminagayoshi | |
| 2005/0272505 A1 | 12/2005 | Okamura | |
| 2006/0005240 A1 | 1/2006 | Sundarrajan et al. | |
| 2006/0282774 A1 | 12/2006 | Covell et al. | |
| 2008/0158232 A1* | 7/2008 | Shuster | G06T 13/40 345/474 |
| 2008/0207322 A1* | 8/2008 | Mizrahi | A63F 13/12 463/32 |
| 2008/0263460 A1 | 10/2008 | Altberg et al. | |
| 2008/0278448 A1 | 11/2008 | Nilsagard et al. | |
| 2009/0112906 A1 | 4/2009 | Shuster | |
| 2009/0249224 A1* | 10/2009 | Davis | G06F 17/241 715/753 |
| 2009/0259948 A1* | 10/2009 | Hamilton, II | H04L 67/38 715/757 |
| 2010/0045697 A1 | 2/2010 | Reville et al. | |
| 2010/0303444 A1 | 2/2010 | Sasaki et al. | |
| 2010/0070859 A1* | 3/2010 | Shuster | G06T 19/20 715/706 |
| 2010/0138432 A1 | 6/2010 | Noyes | |
| 2010/0142447 A1 | 6/2010 | Schlicht et al. | |
| 2010/0273553 A1 | 10/2010 | Zalewski | |
| 2011/0022673 A1 | 1/2011 | Lueth et al. | |
| 2011/0078246 A1* | 3/2011 | Dittmer-Roche | G06F 17/2288 709/205 |
| 2011/0086706 A1 | 4/2011 | Zalewski | |
| 2011/0122063 A1* | 5/2011 | Perlman | A63F 13/335 345/161 |
| 2011/0223994 A1* | 9/2011 | Yerli | A63F 13/847 463/31 |
| 2012/0102418 A1 | 4/2012 | Joy et al. | |
| 2012/0110443 A1* | 5/2012 | Lemonik | G06F 17/2288 715/255 |
| 2012/0184373 A1 | 7/2012 | Kim et al. | |
| 2012/0252580 A1* | 10/2012 | Dugan | A63F 13/31 463/42 |
| 2012/0278731 A1* | 11/2012 | Marinkovich | G06F 3/0481 715/751 |
| 2013/0079132 A1 | 3/2013 | Archer et al. | |
| 2013/0084985 A1 | 4/2013 | Green et al. | |
| 2013/0106989 A1 | 5/2013 | Gage et al. | |
| 2013/0198273 A1 | 8/2013 | Vago et al. | |
| 2013/0227437 A1* | 8/2013 | Brody | H04L 12/1822 715/757 |
| 2013/0244794 A1 | 9/2013 | Yahiro | |
| 2013/0260892 A1 | 10/2013 | Ikeda | |
| 2013/0339847 A1* | 12/2013 | Bartek | G06Q 10/10 715/255 |
| 2013/0344960 A1 | 12/2013 | Perry et al. | |
| 2014/0047027 A1* | 2/2014 | Moyers | H04L 51/04 709/204 |
| 2014/0173462 A1* | 6/2014 | Mattingly | G06Q 10/10 715/753 |
| 2014/0208163 A1 | 7/2014 | Domke et al. | |
| 2014/0349763 A1 | 11/2014 | Lanzoni et al. | |
| 2015/0067745 A1 | 3/2015 | Fear | |
| 2015/0880123 | 3/2015 | Motokura et al. | |
| 2015/0157928 A1 | 6/2015 | Hall et al. | |
| 2015/0238859 A1 | 8/2015 | Fear | |
| 2015/0238875 A1 | 8/2015 | Fear | |
| 2015/0304605 A1 | 10/2015 | Hartman et al. | |
| 2015/0321098 A1 | 11/2015 | van der Laan et al. | |
| 2015/0372845 A1 | 12/2015 | Yoshimochi et al. | |
| 2015/0375117 A1 | 12/2015 | Thompson et al. | |
| 2016/0044073 A1* | 2/2016 | Rosenberg | H04L 65/4038 715/753 |
| 2016/0158653 A1 | 6/2016 | Fear | |
| 2016/0170616 A1* | 6/2016 | Rosenberg | G06F 3/04842 715/753 |
| 2016/0287988 A1 | 10/2016 | Huang et al. | |
| 2016/0287996 A1 | 10/2016 | Huang et al. | |
| 2016/0375363 A1 | 12/2016 | Connor et al. | |
| 2017/0080340 A1 | 3/2017 | Dugan | |

\* cited by examiner

SYSTEM AND METHOD FOR COOPERATIVE APPLICATION CONTROL

CROSS-REFERENCE TO RELATED APPLICATION

This application is related to U.S. patent application Ser. No. 14/017,695, filed by Fear on Sep. 4, 2013, entitled "System and Method for Providing Real-Time Assistance Regarding a Cloud-Based Application," commonly assigned with this application and incorporated herein by reference. Further, this application claims the benefit of U.S. Provisional Patent Application Ser. No. 62/142,177, filed by Huang, et al., on Apr. 2, 2015, entitled "System and Method for Cooperative Game Control," commonly assigned with this application and incorporated herein by reference.

TECHNICAL FIELD

This application is directed, in general, to cloud computing and, more specifically, to a system and method for cooperative application control.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Cloud graphics architectures allow a wide variety of computing devices to interact with the cloud and receive high-quality video from it.

In cloud architectures, similar to conventional media streaming, graphics content is stored, retrieved and rendered on a server where it is then encoded, packetized and transmitted over a network to a client associated with a user as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a system for cooperative application control. In one embodiment, the system includes: (1) a cloud application engine for executing application code configured to allow interaction with an application, generate a video stream corresponding to a particular user and accept a response stream from the particular user to allow the particular user to interact with the application and (2) a cooperative interaction engine associated with the cloud application engine for communication therewith and configured to multicast the video stream from the cloud application engine to the particular user and at least one other user, combine separate response streams from the particular user and the at least one other user into a joint response stream and provide the joint response stream to the cloud application engine.

Another aspect provides a method of cooperatively controlling an application. In one embodiment, the method includes: (1) generating a video stream corresponding to a particular user of the application, (2) multicasting the video stream to the particular user and at least one other user and (3) combining separate response streams from the particular user and the at least one other user into a joint response stream, thereby causing the particular user and the at least one other user to interact with the application cooperatively.

Yet another aspect provides a cooperative interaction engine. In one embodiment, the cooperative interaction engine includes: (1) a video stream multicaster configured to receive from a cloud application engine a video stream corresponding to a particular user and multicast the video stream from the cloud application engine to the particular user and at least one other user and (2) a response stream combiner coupled to the video stream multicaster and configured to combine separate response streams from the particular user and the at least one other user into a joint response stream and provide the joint response stream to the cloud application engine.

BRIEF DESCRIPTION

Reference is now made to the following descriptions taken in conjunction with the accompanying drawings, in which.

DETAILED DESCRIPTION

As the Background above implies, cloud-based applications are popular. Their popularity is likely to continue growing as Internet processing, storage and transport resources grow. Cloud-based applications are particularly popular, because users do not have to install them on their own devices, do not have to update them, do not have to reinstall them on later-acquired devices and can gain access to them and the files on which they operate via multiple of their devices. Access to cloud-based applications is charged more like a short-term rental than a purchase.

As those skilled in the art are aware, the facile operation of more complex applications such as word processors, spreadsheets, presentation tools, video or audio editors, database managers and desktop publishers often requires significant skill, acquired over time. In the case of single-user applications, attaining this skill can be painful and frustrating. Over time, however, the user acquires the desired skills, and facility and output quality improves. In the case of collaborative applications, others can sometimes witness the lack of skill, which is embarrassing and off-putting.

It is realized herein that a user may gain skills and facility by being able to enlist the help of others. More specifically, it is realized herein that a user would benefit from actual, mutually interactive contributions of other users, as opposed to mere advice, perhaps delivered by a phone, across the room or over-the-shoulder. The term, "cooperative interaction," or "cooperative application control" will be used synonymously to denote this concept.

"Cooperative interaction" is different from online sharing and collaboration, e.g., Google® Docs from Google® or Project Harmony by Dropbox®. "Cooperative interaction" involves the cooperatively interacting users viewing the same video stream and providing joint control such that the users interact as though they are a single user. From the perspective of the application, the cooperatively interacting users are treated and appear as a single user. One advantage of various embodiments of cooperative interaction is that the "workpiece," i.e. the file or files on which the users are collaboratively working via the application, need not be copied or moved from one location to another. Thus, rather than having to send one or more files from one user's client to another and perhaps back again, the file can remain on one system and be modified by various users, even simultaneously, over time.

It is further realized herein that existing, "legacy" applications should be able to accommodate cooperative interaction without having to modify them. More specifically, it is further realized herein that cooperative interaction middleware may be employed to receive and multicast a video stream created by the application for a particular user. It is yet further realized herein that the cooperative interaction middleware can receive a response stream from each of the cooperatively interacting users and create a joint response stream that appears to the application as though it originated in a single user.

A "video stream" is a series of frames of rendered video images, which may or may not include audio, designed to be delivered at a rate that causes a viewer to interpret them as conveying motion (i.e. at least 12 frames per second, and typically 18 frames per second or greater). "Cooperative interaction middleware" is software or firmware that mediates communication between allow interaction with an application and one or more cooperatively interacting users. The cooperative interaction middleware may execute on a server in the cloud, resulting in a "cooperative interaction engine." For purposes of the disclosure herein, an "application" is software and/or firmware code intended to perform a useful function for one or more users. An application can come in many forms, but exclude entertaining or educational games and is not specific to any particular computing platform. Major categories of applications include: word processors, spreadsheets, presentation tools, video or audio editors, database managers and desktop publishers. The application may execute on a server in the cloud, resulting in a "cloud application engine." A "response stream" is a sequence of responses a user provides to allow interaction with an application, and the user may provide the responses by means of one or more input devices, e.g., button, mouse, switch, joystick, yoke or pedal. The sequence of responses may open or close a document or file in the application and modify in a certain way, e.g., to add, reorder or delete content, to operate differently, to merge or split or to change its attributes. Inputs and input devices for manipulating files or documents vary about as widely as the applications themselves, but keyboards and mice seem to be current staples.

It is yet further realized that the cooperative interaction middleware or engine may create a joint response stream from separate response streams in various ways. Several examples of ways in which a joint response stream may be created will be described below, with the understanding that those skilled in the pertinent art will, given the teachings and suggestions herein, devise other ways that yield embodiments that fall within the broad scope of the invention.

It is still further realized herein that the application may be a collaborative application, and that fewer than all of its users may be interacting cooperatively. Those who are not interacting cooperatively are said herein to be interacting individually, which is the conventional way collaborative applications are employed.

Accordingly, introduced herein are various embodiments of a system and method for cooperative application control. The embodiments generally provide a way for gamers to come together to cooperate in the control of a document or file in an application. Each of the cooperatively interacting users receives the same video output from the application, and their separate responses are joined together in some way to yield a unified response to the application. Various embodiments will also be introduced for creating or ending cooperative interaction, adding or subtracting cooperative users and modifying the way in which separate response streams are joined. These and other embodiments will now be described in detail.

Figure 1:
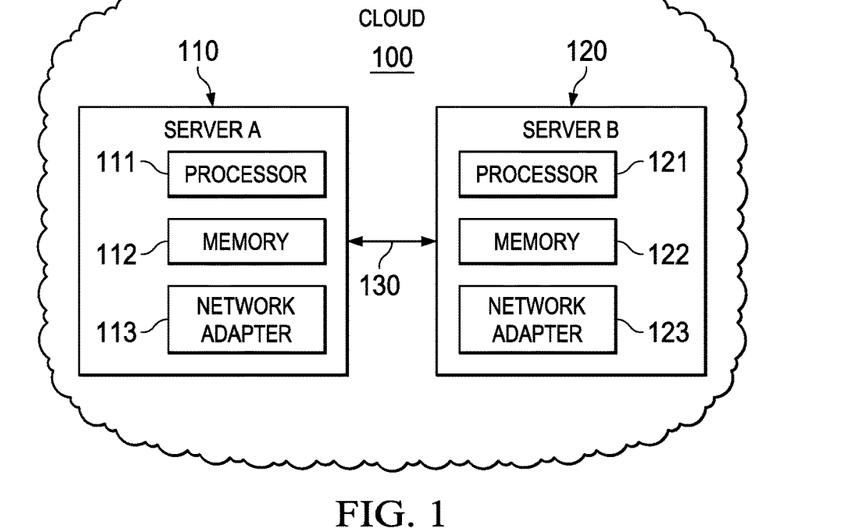
FIG. 1 is a diagram of one embodiment of a cloud of computing resources having processing and storage resources therein.

FIG. 1 is a diagram of one embodiment of a cloud 100 of computing resources, including processing and storage resources therein. As those skilled in the pertinent art understand, a "cloud" is an abstract term for a collection of networked processing and storage resources. The Internet represents perhaps the most significant example of a cloud. However, intranets, extranets or other physical or virtual networks may serve as clouds.

The cloud 100 embodiment of FIG. 1 is illustrated as including two servers: server A 110 and server B 120. Server A 110 takes the form of a computer and includes a processor 111, memory 112 and a network adapter 113. The processor 111 includes one or more central processing units (CPUs) (not shown) and often one or more co-processors, which may take the form of one or more graphics processing units (not shown). The memory 112 usually contains a mix of read-only memory (ROM) or other nonvolatile solid-state memory, volatile random-access memory (RAM) and one or more solid-state or hard drive storage units. Likewise, server B 120 takes the form of a computer and includes a processor 121, memory 122 and a network adapter 123.

Figure 2:
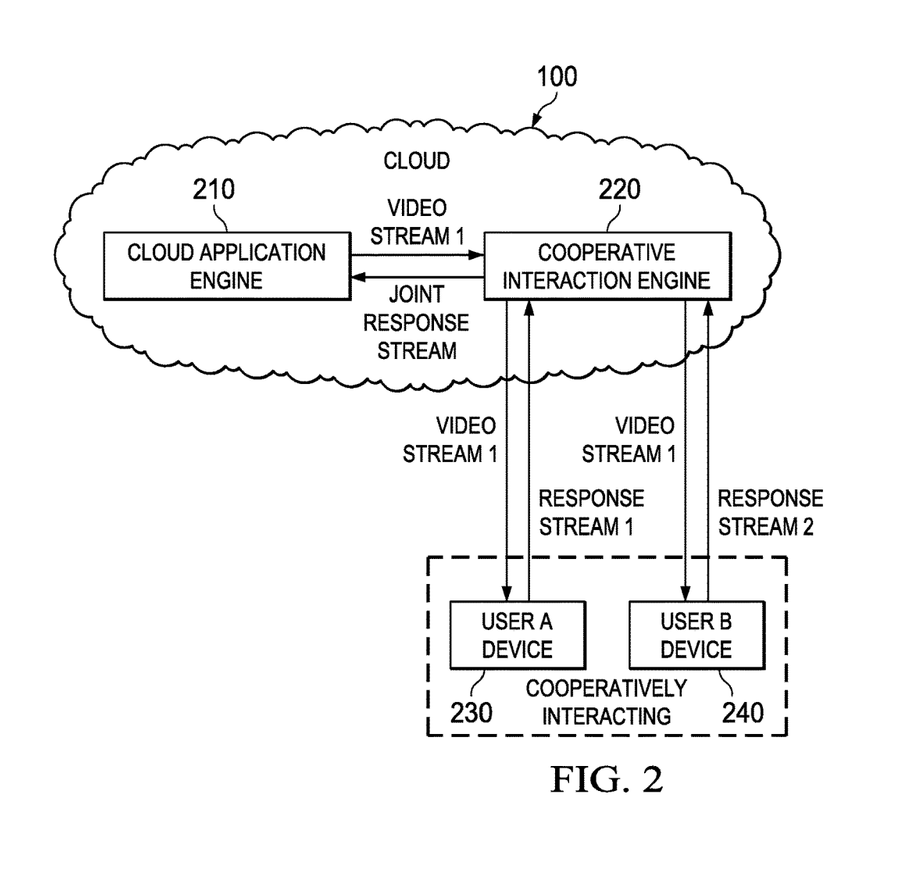
FIG. 2 is a diagram of one embodiment of the cloud of FIG. 1 having a cloud application engine and a cooperative interaction engine and capable of supporting cooperative application control.

FIG. 2 is a diagram of one embodiment of the cloud of FIG. 1 having a cloud application engine and a cooperative interaction engine and capable of supporting cooperative application control. The cloud 100 is illustrated as including a cloud application engine 210 and a cooperative interaction engine 220. In one embodiment, the cloud application engine 210 is embodied in the server A 110 of FIG. 1, and the cooperative interaction engine 220 is embodied in the server B 120 of FIG. 1. In another embodiment, the cloud application engine 210 and the cooperative interaction engine 220 are embodied in a single server. In yet another embodiment, one or both of the cloud application engine 210 and the cooperative interaction engine 220 are embodied in multiple servers.

In the embodiment of FIG. 2, the cloud application engine executes application code (not shown) that instantiates, or brings into existence, allow interaction with an application. The application is configured to generate a video stream 1 for a single user, user A, conveying a view of the application in which user A can interact with it. The application is also configured to receive a response stream from user A containing responses (commands or actions) that user A makes as user A interacts with the application.

However, as is introduced herein, user A wishes to enlist the help or cooperation of another person in interacting with the application. User A wishes that the other person cooperate with user A to interact with a document or file via the application to some degree or extent. That person agrees to cooperate, and thus will now be called "user B." In cooperative interaction, users A and B have separate devices, which may be computers, mobile devices or the like. Accordingly, with reference to FIG. 2, user A is associated with a device 230, and user B is associated with a device 240.

Arrows in FIG. 2 denote the communication of data among the cloud application engine 210, the cooperative interaction engine 220, the device 230 and the device 240. As stated above, the cloud application engine 210 creates a video stream 1 for user A. The video stream 1 is received by the cooperative interaction engine 220. The cooperative interaction engine 220 then causes the video stream 1 to be multicast to both the device 230 (associated with user A) and the device 240 (associated with user B), as FIG. 2 illustrates.

Both user A and user B provide input to the application in response to the video stream 1, resulting in respective response stream 1 and response stream 2. As FIG. 2 also illustrates, the response stream 1 is transmitted by the device 230, and the response stream 2 is transmitted by the device 240. The cooperative interaction engine 220 receives both the response stream 1 and response stream 2, and combines the response stream 1 and response stream 2 to yield a joint response stream. As FIG. 2 illustrates, the cooperative interaction engine 220 transmits the joint response stream to the cloud application engine 210, which handles the joint response stream as though it were coming from a single user (namely user A).

Those skilled in the pertinent art will realize that the cloud application engine 210 need not be modified in any way to accommodate cooperative interaction. The cloud application engine 210 needs only to be instructed to transmit the video stream 1 to the cooperative interaction engine 220 and receive the joint response stream from the cooperative interaction engine 220. In this sense, the cooperative interaction engine 220 serves as a proxy for user A. It is readily apparent that the ability to enhance existing (legacy) applications and application engines to accommodate cooperative interaction without requiring those applications or application engines to be modified is a significant potential advantage in certain embodiments.

Figure 3:
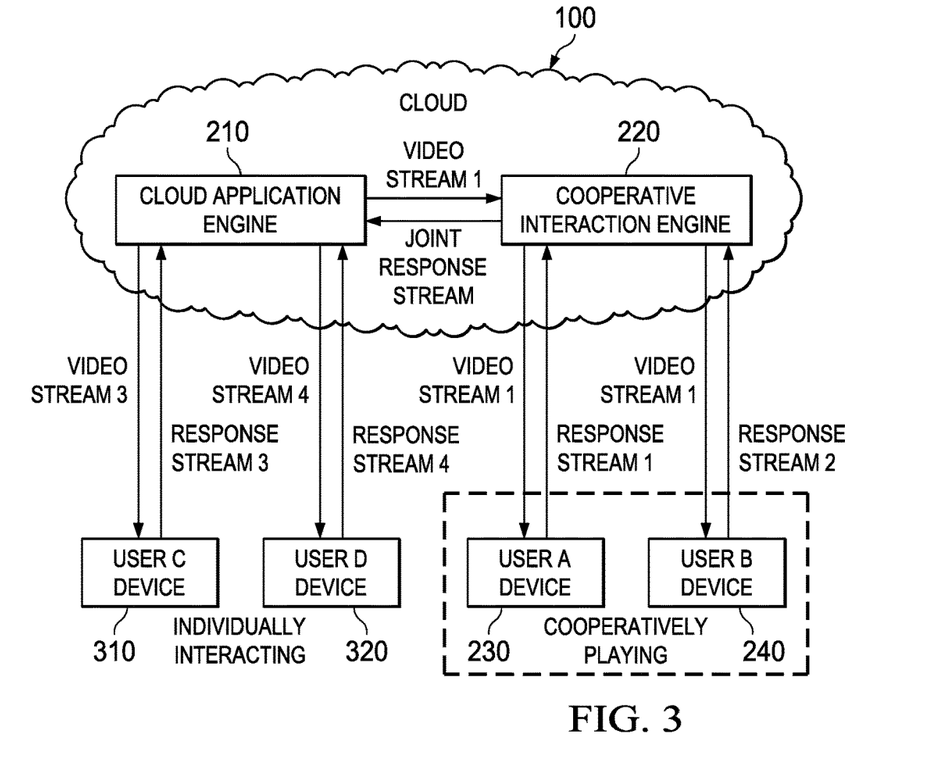
FIG. 3 is a diagram of one embodiment of the cloud of FIG. 1 or 2 having a cloud application engine and a cooperative interaction engine and capable of supporting cooperative application control in the context of a collaborative application.

FIG. 3 is a diagram of one embodiment of the cloud of FIG. 1 or 2 having a cloud application engine and a cooperative interaction engine and capable of supporting cooperative application control in the context of a collaborative application.

In the embodiment of FIG. 3, the cloud application engine executes application code (not shown) that instantiates, or brings into existence, an application. The application is configured to generate a video stream 1 for one user (user A in the example of FIG. 3), a video stream 3 for another user (user C in the example of FIG. 3) and a video stream 4 for yet another user (user D in the example of FIG. 3). Each of the video streams (1, 3 and 4) typically convey different views of a document or file opened in the application with which the respective users (A, C and D) can interact. The application is also configured to receive response streams from users A, C and D containing responses (commands or actions) that users A, C and D make as they interact with the application.

However, as in the embodiment of FIG. 2, user A wishes to enlist the help or cooperation of another person in interacting the application. Again, user A wishes that the other person cooperate with user A to control user A's character or object in the application to some degree or extent. That person agrees to cooperate, and, as before, will now be called "user B." Also as before, users A and B have separate devices 230, 240, respectively. Users C and D also have separate devices 310, 320, respectively, at which they receive video stream 3 and video stream 4, respectively, and from which they provide response stream 3 and response stream 4, respectively.

As in FIG. 2, arrows in FIG. 3 denote the communication of data among the cloud application engine 210, the cooperative interaction engine 220, the device 230, the device 240, the device 310 and the device 320. As stated above, the cloud application engine 210 creates a video stream 1 for user A. The video stream 1 is received by the cooperative interaction engine 220. The cooperative interaction engine 220 then causes the video stream 1 to be multicast to both the device 230 (associated with user A) and the device 240 (associated with user B).

Both user A and user B provide responses to the application based on the video stream 1, resulting in respective response stream 1 and response stream 2. As FIG. 2 also illustrates, the response stream 1 is transmitted by the device 230, and the response stream 2 is transmitted by the device 240. The cooperative interaction engine 220 receives both the response stream 1 and response stream 2, and combines the response stream 1 and response stream 2 to yield a joint response stream.

Concurrently, the cloud application engine 210 creates the video stream 3 for user C and the video stream 4 for user D. However, unlike the video stream 1, the cloud application engine 210 provides the video stream 3 directly to the device 310 and the video stream 4 to the device 320. Both user C and user D provide responses to the application based on the respective video stream 3 and video stream 4, resulting in respective response stream 3 and response stream 4. However, unlike the response stream 1 and the response stream 2, the device 310 and the device 320 provide the respective response stream 3 and response stream 4 directly to the cloud application engine. Thus, the cloud application engine treats user C and user D as distinct, individual users, while user A and user B appear as a single user.

Figure 4:
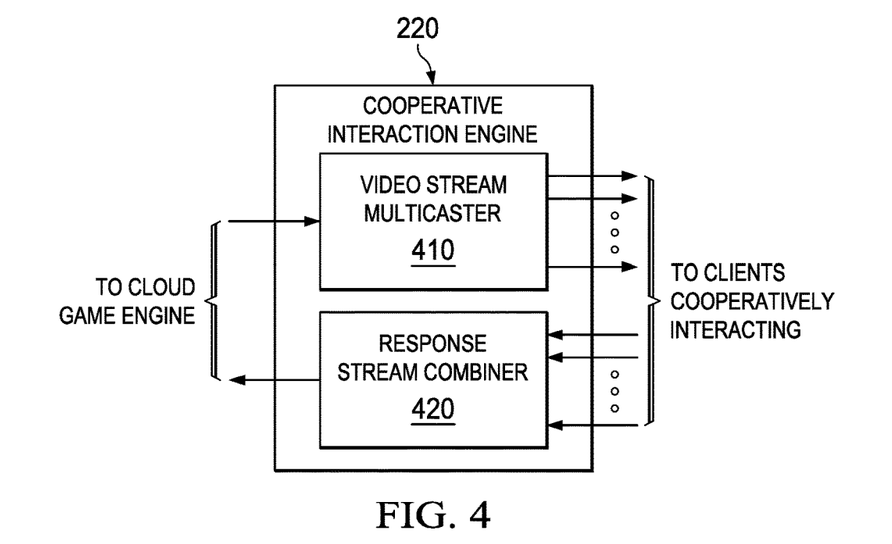
FIG. 4 is a block diagram of one embodiment of a cooperative interaction engine.

FIG. 4 is a block diagram of one embodiment of the cooperative interaction engine 220. The illustrated embodiment of the cooperative interaction engine 220 includes a video stream multicaster 410. The video stream multicaster 410 is configured to receive from a cloud application engine a video stream corresponding to a particular user and multicast the video stream from the cloud application engine to the particular user and at least one other user. Those skilled in the pertinent art understand that multicasting is known, and that conventional as well as later-developed multicasting techniques fall within the broad scope of the invention.

The illustrated embodiment of the cooperative interaction engine 220 further includes a response stream combiner 420. The response stream combiner 420 is coupled to the video stream multicaster 410 (in the sense that they cooperate with one another to effect cooperative interaction) and is configured to combine separate response streams from the particular user and the at least one other user into a joint response stream. The response stream combiner 420 is further configured to provide the joint response stream to the cloud application engine.

In one embodiment, the cooperative interaction engine 220 is configured to combine the separate response streams by interleaving the separate response streams. One example of such interleaving will now be given. In this example, the application allows a user to perform word processing on a document. The user can add text effects to the document by selecting certain commands from a menu. User A and user B, who are cooperatively interacting with the application, use their respective keyboards and/or mice to provide text effect responses that, typically together with other responses, are contained in their respective response streams, which are received by the response stream combiner 420 of the cooperative interaction engine 220. The response stream combiner 420 interleaves the text effect responses into a joint response stream by taking text effect run response from user A, then one text effect response by user B, then one text effect response from user A, and so on, until the all the text effect responses have been incorporated into the joint response stream.

In one embodiment, the cooperative interaction engine 220 is configured to combine the separate response streams based on times responses in the separate response streams are invoked. One example of such combining will now be given. In this example, the application allows a user to add a graph to a spreadsheet. The graph can be added and modified by selecting certain commands from a menu. User A and user B, who are cooperatively interacting with the spreadsheet, use their respective keyboards and/or mice to provide graph addition/modification responses that, typically together with other responses, are contained in their respective response streams, which are received by the response stream combiner 420 of the cooperative interaction engine 220. The response stream combiner 420 combines the addition/modification responses into a joint response stream by placing each addition/modification response in the joint response stream as it is received from each of user A and user B. Thus, if the response stream from user A has three addition/modification responses during a given period of time, and the response stream from user B has five addition/modification responses during the same period of time, the joint response stream will contain eight addition/modification responses during the same period of time.

In one embodiment, the cooperative interaction engine 220 is configured to assign windows of time to the particular user and the at least one other user and combine the separate response streams based on the windows of time. One example of such assigning and combining will now be given. In this example, the application allows a user to edit a presentation. The user can select an edit tools (from a menu of tools) by pushing a mouse button and use the tool by moving his mouse. User A and user B, who are cooperatively interacting through the character, use their respective mice to provide edit responses that, typically together with other responses, are contained in their respective response streams, which are received by the response stream combiner 420 of the cooperative interaction engine 220. The response stream combiner 420 assigns one-second intervals of time, first to user A, then to user B, then to user A, and so on. During user A's one-second interval, user A's edit responses are incorporated into the joint response stream (and user B's edit responses are ignored). Then, during user B's subsequent one-second interval, user B's edit responses are incorporated into the joint response stream (and user A's edit responses are ignored). Next, during user A's subsequent one-second interval, user A's edit responses are incorporated into the joint response stream (and user B's edit responses are ignored), and so on.

In one embodiment, the cooperative interaction engine 220 is configured to combine the separate response streams based on previously received responses in the separate response streams. An example of such combining will now be given. In this example, the application allows a user to edit a video file. User A and user B, who are cooperatively interacting through the hot-air balloon, use their respective keyboards and/or mice to provide edit responses that, typically together with other responses, are contained in their respective response streams, which are received by the response stream combiner 420 of the cooperative interaction engine 220. The response stream combiner 420 detects multiple edit responses in user A's response stream, but no edit responses in user B's response stream. Accordingly, the response stream combiner 420 places user A's edit responses into the joint response stream. If user B's response stream then begins to include edit responses, the response stream combiner 420 will ignore them until user A's response stream stops including edit responses for some interval, e.g., 0.5 second. At that time, the response stream combiner 420 will accept a edit response from either user A's or user B's response stream (to the exclusion of the other) until an interval again passes with no further edit responses. In this manner, either user A and user B can temporarily take over and actively control some response to the exclusion of the other user.

In one embodiment, the cooperative interaction engine 220 is configured to combine the separate response streams based on rankings of the particular user and the at least one other user. One example of such combining will now be given. User A and user B each have a ranking with respect to a particular application, which may be based on a certification issued by the developer of the application. It is assumed for purposes of this example that user B has a higher rank, and is therefore ostensibly a more experienced user at the application in question, than user A. User A and user B, who are cooperatively interacting with, for example a database manager application, use their respective keyboards, mice or other controls to provide responses that are contained in their respective response streams, which are received by the response stream combiner 420 of the cooperative interaction engine 220. The response stream combiner 420 combines responses into a joint response stream by taking all the responses from user B, together with only those responses from user A that do not conflict with the responses from user B. Thus, if user A provides a field modification response that is substantially different from a field modification response from user B, the field modification response from user A is ignored. On the other hand, if a field modification response from user A is substantially similar to a field modification response from user B, the field modification response from user A is combined in the joint response stream.

Those skilled in the pertinent art will understand that although only two cooperatively interacting users have been described above, more users may be engaged in cooperative interaction in certain embodiments. Further, it should be apparent that many other embodiments exist for combining separate response streams into a joint response stream. These embodiments need not be static, either. They may change over time or differ according to a given character or object function.

Certain embodiments of the cooperative interaction engine 220 accommodate control functions that do not necessarily involve interaction with the cloud application engine 210. For example, a user (not shown) may interact with the cooperative interaction engine 220 to initiate a session of cooperative interaction, invite other users to join him in cooperative interaction, determine the way or ways in which the response stream combiner 420 may combine the various cooperative users' response streams into a joint response stream, disengage disruptive users from cooperative interaction, establish and conduct communication between or among cooperative users by text messaging or intercom or select an application with which to interact. These are but a few examples.

Figure 5:
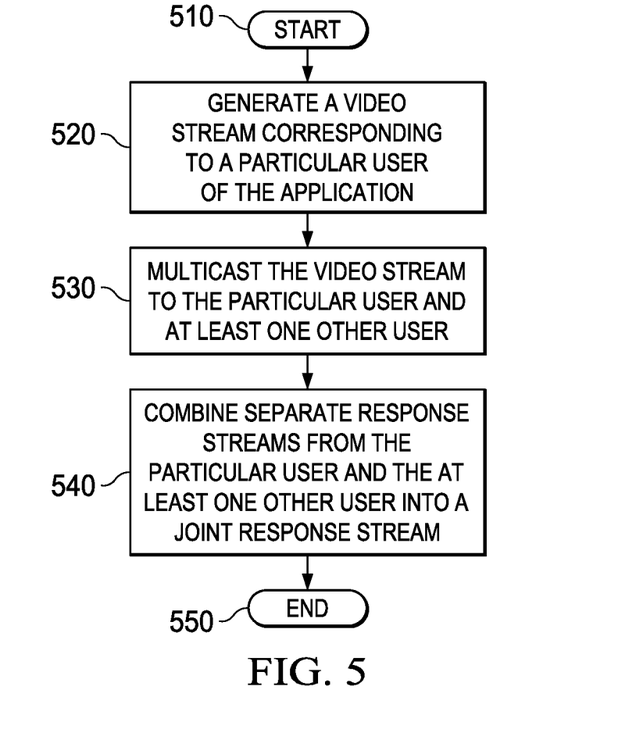
FIG. 5 is a flow diagram of one embodiment of a method of cooperatively controlling an application.

FIG. 5 is a flow diagram of one embodiment of a method of cooperatively controlling an application. The method begins in a start step 510. In a step 520, a video stream corresponding to a particular user of the application is generated. In a step 530, the video stream is multicast to the particular user and at least one other user. In a step 540, separate response streams from the particular user and the at least one other user are combined into a joint response stream. This causes the particular user and the at least one other user to interact with the application cooperatively. The method ends in an end step 550.

Those skilled in the pertinent art will understand that the various embodiments described above generally introduce a method of collaborative cloud access to an application, such as a word processor, a spreadsheet application, a presentation application, a video editor, a database manager, a computer-aided design application or a circuit design application.

Figure 6:
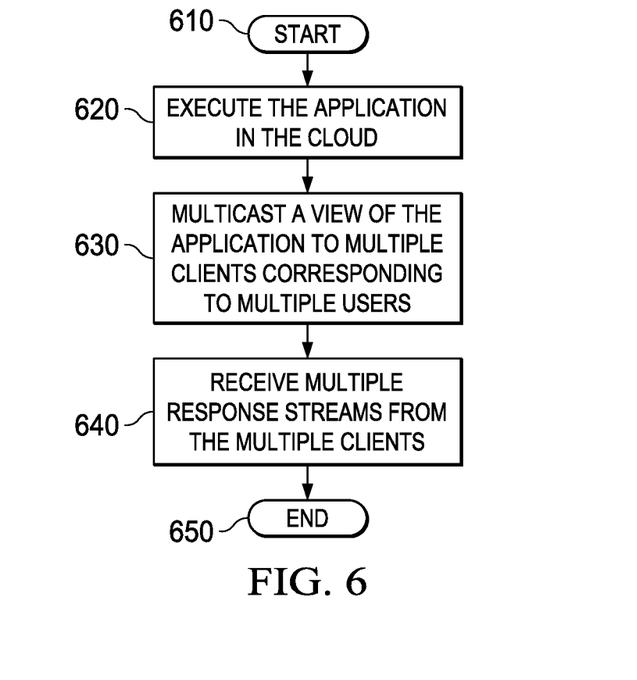
FIG. 6 is a flow diagram of one embodiment of a method of collaborative cloud access to an application.

FIG. 6 is a flow diagram of one embodiment of such method. The method of FIG. 6 begins in a start step 610. In a step 620, the application is executed in the cloud, i.e. executed on one or more networked computer systems, e.g., one or more servers. In a step 630, a view of the application is multicast to multiple clients corresponding to multiple users. In a step 640, multiple response streams are received from the multiple clients. The multiple response streams allow the multiple users to collaborate simultaneously via the application on a single workpiece, such as a single document, a single spreadsheet, a single presentation, a single video production, a single database, a single mechanical design or a single electrical design. The method ends in an end step 650.

Those skilled in the art to which this application relates will appreciate that other and further additions, deletions, substitutions and modifications may be made to the described embodiments.

What is claimed is:

1. A system for cooperative application control, comprising:
    a cloud application engine, embodied in at least one server of said system, for executing application code configured to allow interaction with an application, generate a video stream corresponding to a particular user and accept a response stream from said particular user to allow said particular user to interact with said application; and
    a cooperative interaction engine associated with said cloud application engine, embodied in said at least one server of said system, for communication therewith and configured to multicast said video stream from said cloud application engine to said particular user and at least one other user, combine separate response streams from said particular user and said at least one other user into a joint response stream, wherein said joint response stream is a sequence of responses said particular user and said at least one other user provides from one or more input devices, and provide said joint response stream to said cloud application engine which handles said joint response stream as a response stream from a single user.

2. The system as recited in claim 1 wherein said application code accepts said joint response stream in a same manner as said application code accepts other streams.

3. The system as recited in claim 1 wherein said cooperative interaction engine is configured to combine said separate response streams by interleaving said separate response streams.

4. The system as recited in claim 1 wherein said cooperative interaction engine is configured to combine said separate response streams based on a number of times responses in said separate response streams are invoked.

5. The system as recited in claim 1 wherein said cooperative interaction engine is configured to assign windows of time to said particular user and said at least one other user and combine said separate response streams based on said windows of time.

6. The system as recited in claim 1 wherein said cooperative interaction engine is configured to combine said separate response streams based on previously received responses in said separate response streams.

7. The system as recited in claim 1 wherein said cooperative interaction engine is configured to combine said separate response streams based on rankings of said particular user and said at least one other user.

8. The system as recited in claim 1 wherein said application is a collaborative application and said video stream is one of a plurality of video streams for a corresponding plurality of users.

9. A method of cooperatively controlling an application, the method comprising:
    generating a video stream corresponding to a particular user of said application;
    multicasting said video stream to said particular user and at least one other user; and
    combining separate response streams from said particular user and said at least one other user into a joint response stream, wherein said joint response stream is a sequence of responses said particular user and said at least one other user provides from one or more input devices, thereby causing said particular user and said at least one other user to interact with said application cooperatively, said application handles said joint response stream as a response stream from a single user.

10. The method as recited in claim 9 wherein application code carries out said generating, said application code accepts said joint response stream in a same manner as said application code accepts other streams.

11. The method as recited in claim 9 wherein said combining comprises interleaving said separate response streams.

12. The method as recited in claim 9 wherein said combining comprises combining said separate response streams based on a number of times responses in said separate response streams are invoked.

13. The method as recited in claim 9 wherein said combining comprises:
   assigning windows of time to said particular user and said at least one other user; and
   combining said separate response streams based on said windows of time.

14. The method as recited in claim 9 wherein said combining comprises combining said separate response streams based on previously received responses in said separate response streams.

15. The method as recited in claim 9 wherein said combining comprises combining said separate response streams based on rankings of said particular user and said at least one other user.

16. The method as recited in claim 9 wherein said application is a collaborative application and said method further comprises generating a plurality of video streams for a corresponding plurality of users.

17. A cooperative interaction engine, comprising:
   a video stream multicaster, embodied in at least one server of a system for cooperative application control, configured to receive from a cloud application engine a video stream corresponding to a particular user and multicast said video stream from said cloud application engine to said particular user and at least one other user; and
   a response stream combiner, embodied in said least one server of said system, coupled to said video stream multicaster and configured to combine separate response streams from said particular user and said at least one other user into a joint response stream, wherein said joint response stream is a sequence of responses said particular user and said at least one other user provides from one or more input devices, and said responses stream combiner is further configured to provide said joint response stream to said cloud application engine which handles said joint response stream as a response stream from a single user.

18. The engine as recited in claim 17 wherein said response stream combiner is configured to combine said separate response streams by interleaving said separate response streams.

19. The engine as recited in claim 17 wherein said response stream combiner is configured to combine said separate response streams based on a number of times responses in said separate response streams are invoked.

20. The engine as recited in claim 17 wherein said response stream combiner is configured to assign windows of time to said particular user and said at least one other user and combine said separate response streams based on said windows of time.

21. The engine as recited in claim 17 wherein said response stream combiner is configured to combine said separate response streams based on previously received responses in said separate response streams.

22. The engine as recited in claim 17 wherein said response stream combiner is configured to combine said separate response streams based on rankings of said particular user and said at least one other user.

* * * * *